March 17, 1925.

E. A. MILHAUPT

SHOCK ABSORBER

Filed Dec. 1, 1922

1,529,844

INVENTOR.
Edgar A. Milhaupt
BY
Erwin Wheeler & Woolard
ATTORNEYS.

Patented Mar. 17, 1925.

1,529,844

UNITED STATES PATENT OFFICE.

EDGAR A. MILHAUPT, OF APPLETON, WISCONSIN.

SHOCK ABSORBER.

Application filed December 1, 1922. Serial No. 604,126.

*To all whom it may concern:*

Be it known that I, EDGAR A. MILHAUPT, a citizen of the United States, residing at Appleton, county of Outagamie, and State of Wisconsin, have invented new and useful Improvements in Shock Absorbers, of which the following is a specification.

This invention relates to improvements in shock absorbers.

It is an object of this invention to provide a shock absorber having a set of helical shock absorbing springs each of which are operatively engaged successively by a piston associated with the body supporting spring of a vehicle.

More specifically stated, it is an object of this invention to provide a set of shock absorbing springs in such relation to the associated parts that the first spring of the set, when operatively engaged, will offer a predetermined resistance to compression, the second of which, when operatively engaged, will offer a greater resistance to compression than the first, and a third of which when operatively engaged, will add its resistance to the second spring; said springs being also so associated with a second set of springs, that, on the recoil, one will offer a certain degree of resistance to the recoil of the last above mentioned shock absorbing springs, and that, on the recoil, the other of said last mentioned set will in turn offer a less resistance to the return of the first mentioned shock absorbing spring to its normal position.

Each rear body supporting spring of a vehicle ordinarily has its main leaf anchored at its front end to the vehicle frame and the rear end is pivoted to a hanger which allows the spring to compress freely by permitting endwise movement. An object of this invention is to provide a shock absorber having a spring actuating member or piston provided with spaced rollers adapted to engage the end of the main leaf of the vehicle spring so that the end of such leaf may move freely in the direction of its own longitudinal axis, the shock absorber responding only to the movement of the main spring in a vertical plane.

Each front body supporting spring of a vehicle is ordinarily anchored at its front end to the vehicle frame and loosely pivoted at the rear end to the frame to allow the spring to compress freely. To allow the shock absorber to be applied to the front end of such a spring it is an object of this invention to provide a shock absorber of the above type with a lever arm pivotally engaging the front end of the spring and adapted to permit movement of the front end of the spring in a vertical plane against the resistance of the shock absorber at that end while preventing material forward and backward movement, the sliding or roller bearing connection embodied in the rear shock absorbers being thereby eliminated.

It is a further object of the invention to provide a shock absorber of the above type in which practically all of the parts are of standard material and which will require very little machine work, the parts being readily assembled and the shock absorber when so assembled being easily attached to an automobile.

In the drawings.

Like parts are identified by the same reference characters throughout the several views.

Figure 2:
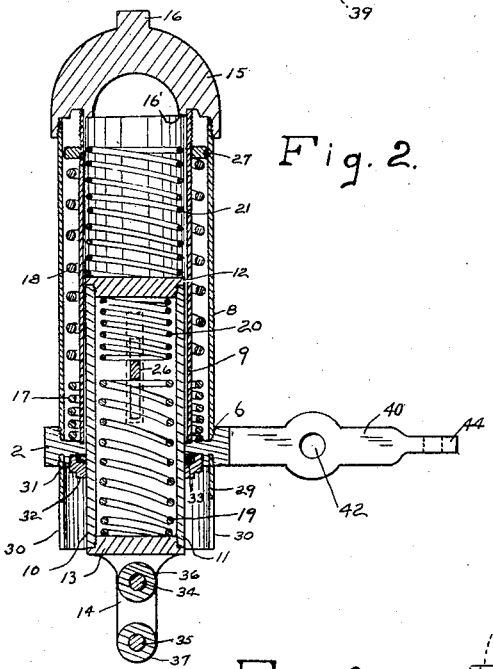
Fig. 2 is a sectional elevation of the device shown in Fig. 1, the frame and spring being removed.
Figure 3:
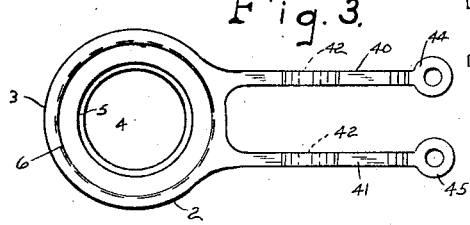
Fig. 3 is a plan view of the bracket shown in Figs. 1 and 2.

The shock absorber 1 is mounted upon a bracket 2 which has a circular portion 3. The circular portion 3 has a central aperture 4 and concentric therewith is an annular shoulder 5. A second annular shoulder 6 is provided concentric with the aperture 4. A tubular member 8 has threaded engagement with the shoulder 6. Disposed within and concentric with the tube 8 is a second tubular member 9 seated within the shoulder 5. This tube 9 has an inner diameter slightly larger than the diameter of the aperture 4 of the bracket. Extending through the aperture and into the tube 9 is a tubular piston 10 which is closed at both ends. The piston 10 is made of three parts comprising the tubular portion 11 threaded at each end to receive at its upper end the threaded cap 12, and at its lower end a threaded cap 13 which, as shown in Figs. 2 and 3, has downwardly extending integral arms 14. Extending between the arms 14 are shafts 34 and 35 upon which are mounted spaced rollers 36 and 37, respectively.

The tubes 8 and 9 are capped by a member 15 having a squared end 16. The member 15 threadedly engages the tube 8 and is screwed into position by means of the squared end 16. The inner tube 9 is held in position by the shoulder 5 in the bracket and the shoulder 16' on the cap 15.

Disposed between the tubes 8 and 9 are two helical springs 17 and 18. Within the piston 10 are disposed two helical springs 19 and 20. Carried upon the piston 10 within the tube 9, is a helical spring 21.

Extending longitudinally of the tube 9, are diametrically opposed longitudinal slots 22 and 23. Registering with the slots 22 and 23 are slots 24 and 25 extending longitudinally of the piston 10. Extending through these slots is a bar 26 disposed between the springs 17 and 18 in the outer tube and springs 19 and 20 within the piston. Threadably engaging the inner tube 9 at its upper end is an annular ring 27 adapted to be positioned relative to the tube 9 so that any desired pressure may be placed upon the springs 17, 18, 19 and 20.

Threadably engaging the under side of the bracket 2 and concentric with the aperture 4 is a tubular member 29 which has diametrically opposed slots 30 extending longitudinally thereof. The member 30 is provided to keep mud and dust from the piston 10 and the slots 30 are provided to accommodate the end 38 of the spring as it follows the piston on its inward movement into the shock absorber. Upon the lower side of the bracket 2 is a shoulder 31 concentric with the aperture 4. Threadably engaging said shoulder 31 is a packing ring 32 adapted to maintain the packing 32 against the piston 10 with sufficient pressure to retain grease within the cylinders of the shock absorber.

Figure 1:
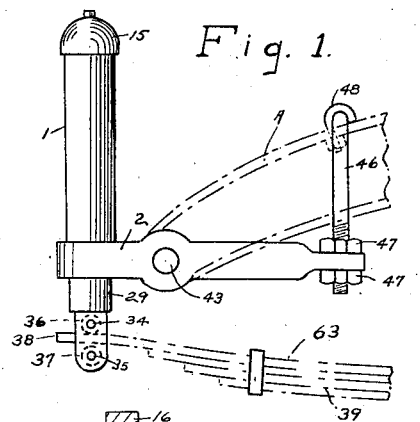
Fig. 1 is a side elevation of the shock absorber showing one manner of attaching it to the frame and spring of an automobile.
Figure 4:
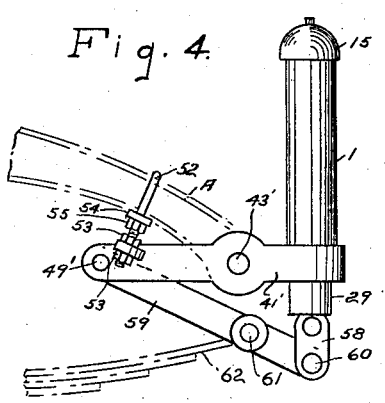
Fig. 4 is a side elevation of the shock absorber showing a modified form of attaching the absorber to the frame and spring of an automobile.
Figure 5:
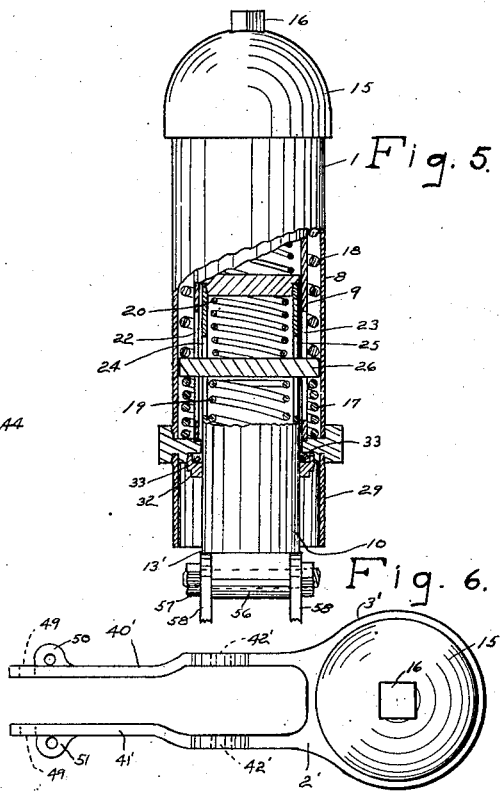
Fig. 5 is an end elevation partly in section of the device shown in Fig. 4.

The shock absorber shown in Figs. 4 and 5 is similar in construction to that shown in Figs. 1 and 2, the method of mounting the absorber upon their respective brackets being the same. It is to be noted, however, that the brackets are of different construction. The bracket shown in Figs. 1, 2 and 3 has two lever arms 40 and 41 provided with apertures 42 adapted to engage the shackle bolt 43 upon the rear end of the frame A. At the ends of the arms are provided enlarged portions 44 and 45 having apertures therethrough adapted to receive the ends of the U-bolt 46. The bolt passes over the frame A and is secured thereto by bolt 43 attached to the frame. The bolt 46 is also secured to the arms 40 and 41 by lock nuts 47.

Figure 6:
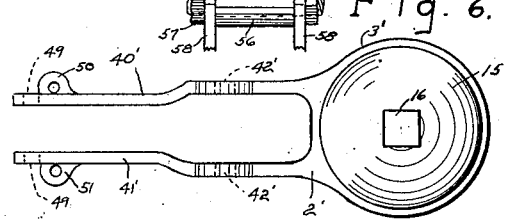
Fig. 6 is a plan view of the device shown in Fig. 4, the frame and spring being removed.

The bracket shown in Figs. 4 and 6 has a portion 3' which is similar to the portion 3 shown in Fig. 6. The two lever arms 40' and 41', however, are of slightly different construction. These arms are provided with apertures 42' adapted to engage the shackle bolt 43' upon the front end of the frame A. Apertures 49 are provided at the end of the arms for the purpose hereinafter described. Ears 50 and 51 are provided near the end of the arms 40' and 41' and have apertures therein adapted to receive the ends of the U-bolt 52, the U-bolt being secured to the ears by means of the lock nuts 53. The bolt 52 is secured to the frame A by means of a plate 54 through which the bolt passes, the plate extending transversely across the frame. This plate is held rigidly against the frame A by nuts 55 threadably engaging the bolt 52.

As will readily be seen the proper vertical alignment of the shock absorber may be attained through the brackets 2 and 2' by pivotal movement of the brackets about the shackle bolts 43 and 43' and the retention of the absorbers in such alignment by the proper adjustment of the lock nuts 47 and 53 relative to the U-bolts.

The piston 10 shown in Fig. 5 has a cap 13' provided with a lug 56 having a hole extending transversely of the piston. A bolt 57 extends through said hole and pivotally supports at its ends shackles 58. A lever 59 is pivotally attached at the ends of the arms 40' and 41' by bolt 49' and is also pivotally attached at its other end to the shackles 58 by bolt 60. The lever 59 is provided intermediate its ends with a bolt 61 adapted to pivotally engage the spring 62.

The shock absorber shown in Figs. 1 and 2 is designed primarily for use upon the rear end of an automobile. As is well known the rear springs of an automobile are anchored at their front ends to the frame and loosely pivoted to the frame at their rear ends to allow for longitudinal movement of the end of the spring when the springs are being flexed toward or away from a straight line. Therefore, in the present invention the rear springs are provided with a main leaf 63 extending rearwardly a sufficient distance to ensure that the end 38 of the spring will at all times be engaged by the rollers 36 and 37 upon the shock absorber when the end moves longitudinally of the frame.

The shock absorber shown in Figs. 4, 5 and 6 is designed primarily for use upon the front end of an automobile. It is well known that the front springs of an automobile are at their front ends anchored to the end of the frame and are at their rear ends pivoted to the frame to allow for longitudinal movement when the springs are compressed. Therefore, in the present invention the main leaf of the spring 62 is pivotally attached to the lever 59 which is adapted, through its pivotal connection to the bracket arms 40' and 41' and the shackles 58, to at all times hold the end of the spring 62 substantially in the same longitudinal position relative to the frame except for the slight change in longitudinal position due to the arc in which the lever 59 swings about the pivot bolt 49. The lever 59 is also provided for the purpose of relieving the piston 10 from the duty of holding the spring in position relative to the frame by placing all of the strain upon the bolt 49' and the arms 40' and 41'.

It is preferred that the shock absorber be packed with sufficient grease to lubricate the operative parts and to keep the spring 21 from rattling. Sufficient clearance is provided between the piston 10 and tube 9 to allow any grease within the tube 9 and which might be under compression between the piston and cap 15 to pass between the piston and tube and through their respective apertures and into the cavity between tubes 8 and 9, and into the cavity of the piston.

The operation of the device is as follows: When a shock is transmitted to the piston 10 tending to force the piston into the tube 9, the spring 19 is compressed between the piston 10 and the bar 26 which is substantially held in a predetermined position by the springs 17 and 18. When the spring 19 has been compressed sufficiently to allow the piston to engage the rod 26 at the lower ends of the slots 24 and 25, the piston will by reason of its engagement with the rod and its further movement into the tube 9, compress the spring 18. When the piston 10 has compressed the spring 18 sufficiently the spring 21 will engage the cap 15 and be compressed upon further inward movement of the piston relative to the tube 9.

It will be understood that the spring 19 is of lighter construction than spring 18 so that when the latter is operatively engaged by the piston a greater resistance is offered to the movement of the piston. In order to provide at a predetermined time a greater resistance than is offered by spring 18 a third spring 21 is provided which when operatively engaged adds its resistance to that of spring 18.

It is to be noted that as the spring 19 is compressed the spring 20 expands and that as the spring 18 is compressed the spring 17 expands. Therefore, as the shock absorbing springs 18, 19 and 21 recoil, the springs 17 and 20 will offer a resistance to the expansion of the respective shock absorbing springs against which they are opposed.

When the wheel of an automobile drops into a depression in the road, the piston 10 will move outwardly of the tube 9 and cause the spring 20 to be compressed between the piston and the rod 26 until the rod strikes the upper ends of the slots 24 and 25. If the piston continues to move outwardly after the rod 26 has contacted with the ends of the slots, the spring 17 will be compressed between rod 26 and bracket 2. It is to be noted that spring 20 is of relatively lighter construction than spring 17 to thereby give a difference in resistance to the outward movement of the piston.

It is to be understood that a piston having shackles 58 may be used in association with the rear shock absorber by pivotally attaching the end of the spring 39 to the shackles. The shackles will, therefore, give the required freedom of movement of the end relative to the frame A and at the same time permit the piston to move freely.

It will also be noted that when the body supporting spring of the automobile is engaged as shown in Fig. 4 or is engaged at the rear end by shackles 58, that the tube 29 will require only one slot 30 to permit the lever 59 or the end of spring 39 to follow the piston as it moves into the absorber.

It will, therefore, be seen that I have provided a shock absorber which has a set of three shock-absorbing springs which are adapted at predetermined times to be operatively engaged, whereby the first spring will offer a desired resistance, whereby the second spring when operatively engaged by the piston will offer a greater resistance than the first spring, and whereby the third spring when operatively engaged will add its resistance to the resistance of the second spring.

It will further be seen that I have provided a shock absorber which has a set of springs adapted to offer a resistance to the expansion of the respective springs to which they are opposed.

It will further be seen that I have provided a shock absorber of the class described which is of cheap manufacture and which may be easily and quickly installed upon an automobile.

It will further be seen that I have provided a shock absorber of the class described having means for engaging one end of an automobile spring, said means being adapted to permit a longitudinal movement of the end of the spring relative to the frame of an automobile.

I claim:

1. In a shock absorber provided with a tubular member closed at one end, the combination with a second tubular member disposed within the first mentioned member, of a hollow piston extending into the second mentioned tubular member, helical springs disposed between said tubular members;

helical springs disposed within said piston, a helical spring disposed within the second tubular member, and means associated with said piston adapted to successively engage said springs.

2. In a shock absorber having a tubular member closed at one end and provided with diametrically opposed, longitudinal slots, the combination with a hollow piston having slots adapted to register with said first mentioned slots, of a set of springs within said piston, a spring within said tubular member and adapted to be operatively engaged between said piston and the closed end of said member, a set of springs disposed about the outer periphery of said member, a bar extending through said apertures, whereby said piston may operatively engage said first and second mentioned springs, and means including an annular ring, whereby said springs upon the outer periphery of said tubular member may be compressed a desired amount.

3. In a shock absorber having a tubular member closed at one end, the combination with a hollow piston extending into said member, of a set of springs disposed within said piston, a spring within said member disposed between said piston and the closed end of said member, and means adapted to operatively engage said springs successively.

4. In a shock absorber, the combination with an apertured bracket, of a hollow piston axially movable through said aperture and closed at its ends, said piston being provided with longitudinal slots, a set of spiral springs disposed within said piston, and a bar disposed between said springs and extending through said slot, said bar being supported from said bracket, whereby when said piston moves axially through said aperture, said springs will be alternately compressed.

5. In a shock absorber for automobiles, the combination with a bracket having an enlarged end provided with an aperture therethrough, of a tubular member secured to said bracket and substantially concentric with said aperture, a second tubular member substantially concentric with said aperture and disposed within said first mentioned member and having diametrically opposed, longitudinal slots, a set of spiral springs disposed between said tubular members, a cap secured to said first mentioned tubular member and adapted to hold said second tubular member in position, a tubular piston closed at both ends having diametrically opposed longitudinal slots adapted to register with said first mentioned slots, said piston extending through said aperture and into said second tubular member and adapted to engage the spring of said automobile, a set of helical springs disposed within said piston, a bar disposed within said first mentioned tubular member and extending through said apertures in said second tubular member and piston and positioned between said sets of springs, and a helical spring disposed between said piston and cap.

6. In a shock absorber for vehicles having a frame and a main spring, the combination with a tubular member provided with a bracket for support from said frame and having a longitudinal slot, of a hollow piston extending into said tubular member and provided with means for engaging said main spring, said piston being closed at its ends and provided with a longitudinal slot adapted to register with the longitudinal slot in said tubular member, a pair of springs disposed within said piston, and means for alternately compressing said springs, said means extending through said slots and being supported from said bracket.

7. In a shock absorber for vehicles having a frame, the combination with a tubular member provided with a bracket for support from said frame, of a hollow piston extending into said tubular member and provided with means for engaging said main spring, a pair of opposed springs disposed within said piston and each engageable therewith and means for alternately compressing said springs and disposed therebetween, said means extending to the exterior of said piston and tubular member and being supported from said bracket.

8. In a shock absorber for vehicles having a frame, the combination with a tubular member provided with a bracket for support from said frame, of a hollow piston extending into said tubular member and provided with means for engaging said main spring, a pair of opposed springs disposed within said piston and each engageable therewith, means for alternately compressing said springs and disposed therebetween, said means extending to the exterior of said piston and tubular member and being supported from said bracket, a single spring disposed within said tubular member exteriorly of said piston and means on said tubular member normally spaced from said single spring and adapted for engagement therewith when one of said pair of springs reaches a certain degree of compression.

9. A shock absorber for automobiles having a frame and a main spring, the combination with a tubular member provided with a bracket for support from said frame, of a hollow piston extending into said tubular member, the pair of opposed springs disposed within said piston and each engageable therewith, a second pair of opposed springs disposed about said tubular member and each engageable with said bracket, and means within said piston extending to the exterior thereof and of said tubular member for alternately compressing each of the springs of each of said pair of springs, said means being disposed between the springs of each pair of springs and engageable with all of the springs simultaneously.

10. In a shock absorber for automobiles having a frame and a main spring, the combination with a tubular member provided with a bracket for support from said frame, of a hollow piston extending into said tubular member, the pair of opposed springs disposed within said piston and each engageable therewith, a second pair of opposed springs disposed about said tubular member and each engageable with said bracket, means within said piston extending to the exterior thereof and of said tubular member for alternately compressing each of the springs of each of said pair of springs, said means being disposed between the springs of each pair of springs and engageable with all of the springs simultaneously, a single spring disposed within said tubular member exteriorly of said piston and means on said tubular member spaced from said single spring for engagement therewith when one of said pairs of springs is compressed to a certain predetermined degree.

11. In a shock absorber for automobiles having a frame and a main spring, the combination with a tubular member provided with a bracket for support from said frame and having a longitudinally extending slot, of a hollow piston disposed within said tubular member and having a longitudinally extending slot adapted to register with the first mentioned slot, a pair of opposed springs disposed within said piston and engageable therewith, and a second pair of opposed springs disposed exteriorly of said tubular member, means disposed between the springs of each pair of springs and extending through said slots, and means on said tubular member adjustable longitudinally thereof for varying the normal degree of compression of one of the springs of the second pair of opposed springs.

12. In a shock absorber for automobiles having a frame and a main spring, the combination with a tubular member provided with a bracket for support from said frame, of a piston extending into said tubular member and engageable with said main spring, a pair of opposed springs each engageable with said piston, a second pair of opposed springs each engageable with said bracket, and means disposed between the springs of each pair of springs for the simultaneous engagement with all of said springs.

13. In a shock absorber for automobiles having a frame and a main spring, the combination with a tubular member provided with a bracket for support from said frame, of a piston extending into said tubular member and engageable with said main spring, a pair of opposed springs each engageable with said piston, a second pair of opposed springs each engageable with said bracket, means disposed between the springs of each pair of springs for the simultaneous engagement with all of said springs, and longitudinally spaced means on said piston for alternately engaging the first mentioned means when one of the springs of the first mentioned pair has been compressed to a predetermined degree.

14. In a shock absorber for automobiles having a frame and a main spring, the combination with a tubular member provided with a bracket for support from said frame, of a piston extending into said tubular member and engageable with said main spring, a pair of opposed springs each engageable with said piston, a second pair of opposed springs each engageable with said bracket, means disposed between the springs of each pair of springs for the simultaneous engagement with all of said springs, and longitudinally spaced means on said piston for alternately engaging the first mentioned means when one of the springs of the first mentioned pair has been compressed to a predetermined degree, and a single spring engaged with said piston, said tubular member having a shoulder portion adapted to be engaged by said single spring when said piston has moved a predetermined distance.

15. In a shock absorber for automobiles having a frame and a main spring, the combination with a tubular member provided with a bracket for support from said frame, of a piston extending into said tubular member and engageable with said main spring, a pair of opposed springs each engageable with said piston, a second pair of opposed springs each engageable with said bracket, means disposed between the springs of each pair of springs for the simultaneous engagement with all of said springs, longitudinally spaced means on said piston for alternately engaging the first mentioned means when one of the springs of the first mentioned pair has been compressed to a predetermined degree, and adjustable means carried from said bracket for varying the normal degree of compression thereof.

EDGAR A. MILHAUPT